United States Patent [19]

Ueda

[11] Patent Number: 4,958,300
[45] Date of Patent: Sep. 18, 1990

[54] POLYGON FILLING CONTROL APPARATUS

[75] Inventor: Tomoaki Ueda, Kyoto, Japan

[73] Assignee: Daikin Industries, Ltd., Osaka, Japan

[21] Appl. No.: 260,512

[22] Filed: Oct. 20, 1988

[30] Foreign Application Priority Data

Oct. 21, 1987 [JP] Japan .................. 62-266856

[51] Int. Cl.$^5$ ............................... G06F 15/20
[52] U.S. Cl. .................... 364/521; 340/723; 364/518; 382/44
[58] Field of Search .............. 364/518, 521, 522; 340/721, 723, 729, 734, 747; 382/44–48

[56] References Cited

U.S. PATENT DOCUMENTS

| 4,475,104 | 10/1984 | Shen | 340/729 |
| 4,609,993 | 9/1986 | Shimizu | 364/522 |
| 4,709,231 | 11/1987 | Sakaibara et al. | 340/729 |
| 4,725,831 | 2/1988 | Coleman | 340/747 |

Primary Examiner—Gary V. Harkcom
Assistant Examiner—H. R. Herndon

[57] ABSTRACT

A polygon filling control apparatus including an image memory unit divided into a plurality of block memories and a plurality of linear interpolation operation units (DDAs) for generating filling pixel data for different line segments. Output data supplied from side interpolation circuits are selectively supplied to the DDAs concerned and simultaneously linearly interpolated, and the filling pixel data generated by the different DDAs are simultaneously written into the image memory unit.

8 Claims, 9 Drawing Sheets

POLYGON FILLING CONTROL APPARATUS

BACKGROUND OF THE INVENTION

1. Field of the Invention

The present invention relates to a polygon filling control apparatus, and more particularly to a novel-type polygon filling control apparatus capable of causing polygon filling data to be written into a memory unit without interrupting a linear interpolation operation unit (hereinafter referred to as a DDA).

2. Description of the Relevant Art

In a graphic display apparatus, it is desirable to increase the capacity of the image memory unit without an increase in the entire cost of the apparatus. Accordingly, a static random access memory unit (hereinafter referred to as a SRAM) is hardly used, but a dynamic random access memory unit (hereinafter referred to as a DRAM) is generally used.

However, when the DRAM is used as an image memory unit, the unit time required for accessing to the DRAM is about 230 to 400 nsec for every one-pixel data, although the DDA takes about 40 to 60 nsec (which is the obtainable highest speed when the DDA is formed in TTL logic) for generating one-pixel data. It is therefore required that, while all pixel data necessary for polygon filling are written into the image memory unit, the arithmetic operation of the DDA is frequently interrupted. This disadvantageously increases the time required for writing filling pixel data into the image memory unit, resulting in a considerable increase in the time required for displaying the image for which the filling operation has been executed.

Figure 10:
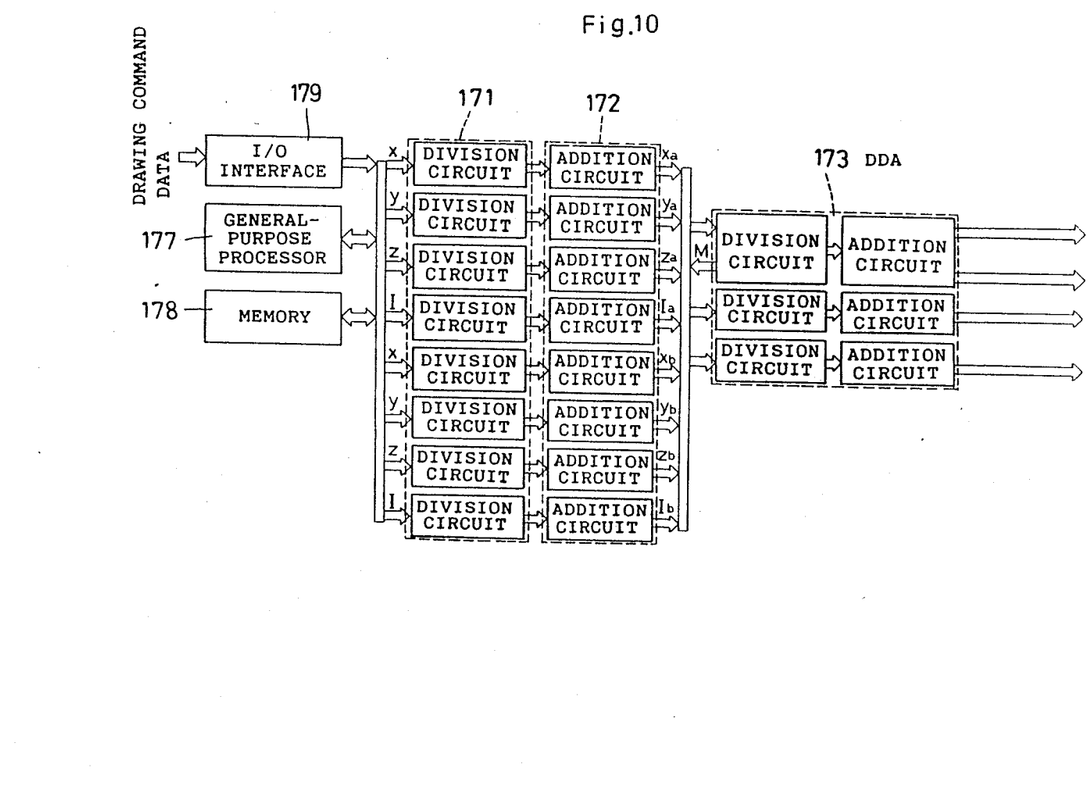
FIG. 10 is a block diagram of an arrangement of a conventional polygon filling apparatus.
Figure 11:
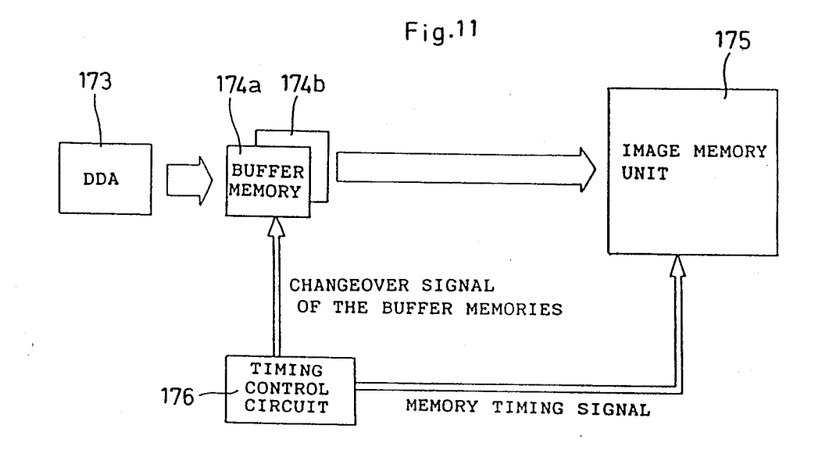
FIG. 11 is a schematic view of a conventional double buffer method.

To overcome such a problem, a graphic display apparatus of the raster scanning type as shown in FIG. 10 is proposed. In this apparatus, dividers 171 and adders 172 receive polygon apex data supplied from a host processor (not shown), and execute linear interpolation of two opposite sides of a polygon for every coordinate data. The coordinate data of the end points of line segments obtained based on the linear interpolation results, are supplied to a DDA 173. As shown in FIG. 11, there are also disposed buffer memories 174a, 174b for temporarily holding a predetermined number, along a scanning line, of filling pixel data supplied from the DDA 173. Also disposed is an image memory unit 175 into which a predetermined number of pixel data supplied from each buffer memory are written. Also disposed is a timing control circuit 176 for controlling the changeover of the buffer memories 174a, 174b and for supplying a memory timing signal to the image memory unit 175. The apparatus having the arrangement above-mentioned will be hereinafter referred to the type of a double buffer method. It is noted that there is also disclosed a general-purpose processor 177, a memory 178 and an I/0 interface 179.

The double buffer method will be described in detail with the arrangement taken as an example in which each buffer memory is adapted to hold 8-pixel data along one scanning line.

According to the double buffer method, provision is made such that, while the DDA 173 supplies filling pixel data to one buffer memory, up to 8-pixel data held in the other buffer memory are collectively supplied to the image memory unit 175.

Accordingly, the DDA 173 takes about 400 nsec. for generating 8-pixel data, and the time required for writing data into the image memory unit 175 is also about 400 nsec at maximum. Therefore, the speed at which filling pixel data in the scanning line direction are generated is made substantially equal to the speed at which data are written into the image memory unit 175, when consideration is made on one-pixel data. Thus, polygon filling may be carried out with the DDA 173 hardly interrupted.

However, when filling a polygon, it is required to generate a considerable number of pixel data. Accordingly, even though pixel data may be generated with the DDA 173 hardly interrupted, such polygon filling speed is not still sufficiently high if a real-time operation is desired in a graphic display apparatus.

The foregoing will be described in more detail in the following.

There is taken an example of a regular square of 20 pixels × 20 pixels, the sides of which are inclined in an arbitrary direction with respect to the scanning line direction. If the pixel data can be generated and written into the image memory unit 175 with the DDA 173 hardly interrupted, it is sufficient to generate and write 80-pixel data into the image memory unit 175 for carrying out a wire frame model display involving no filling. However, when desired to display an image as filled, it is required to generate and write 400-pixel data into the image memory unit 175. In this case, the necessary time would be multiplied by five in a rough theoretical calculation. The difference in time required for the processing will vary in proportion to a square of the size of a polygon figure to be drawn. Accordingly, it is a common practice to make the wire frame display with the natural figure display sacrificed when the real-time operation is strongly desired.

Figure 12:
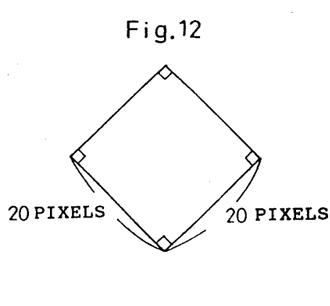
FIG. 12 shows an example of a polygon.

To overcome such problem of displaying, in real time, a polygon figure as filled, it is required to increase the speed at which pixel data are generated by the DDA 173. However, the data generation speed of the DDA 173 formed in TTL logic is limited to a range from about 40 to about 60 nsec, as mentioned earlier. Accordingly, even though the polygon filling is carried out without any interruption of the DDA 173, a maximum of 62500 to 41600 polygons/second may be merely drawn, provided that each of the polygons is converted into a regular square shown in FIG. 12. Further, when overhead such as pixel data input/output is taken into consideration, actually about 50000 to about 33000 polygons may be merely drawn. Accordingly, when considering the case of a three-dimensional hidden surface removal, a shading processing or the like are to be made, the number of polygons which can be drawn will be further lowered.

A DDA formed in ECL logic enables an increase in the highest limit of the speed at which pixel data are generated. However, the use of such ECL-logic DDA not only makes the arrangement large-scaled, but also increases the power consumption. Further, the ECL-logic DDA is susceptible to the influence of noise.

SUMMARY OF THE INVENTION

It is an object of the present invention to increase the polygon filling speed.

It is another object of the present invention to generate filling pixel data for line segments in the scanning line direction at a speed higher than the speed at which pixel data are generated by a DDA, when consideration is made on one-pixel data.

To achieve the objects above-mentioned, the polygon filling control apparatus of the present invention comprises:

an image memory unit constituted by a plurality of block memories;

a plurality of DDAs for generating filling pixel data for different line segments of a polygon divided along the scanning line direction;

timing control means for generating, according to coordinate data supplied from the DDAs, control signals based on which the filling pixel data are written into the block memories concerned; and DDA control means for generating control signals for operating the DDAs concerned, according to the coordinate data of the line segments above-mentioned, in a direction at right angle to the scanning line direction.

Preferably, writing pixel data generated by the DDAs into the block memories is made through double buffer memories.

More preferably, a plurality of block memories are alloted to each of the DDAs, and the timing control means is adapted to select a state where pixel data generated by a DDA are successively written into different block memories alloted to the DDA above-mentioned Preferably, as to the coordinate data in the scanning line direction, the timing control means generates control signals in timing of change in the contents of predetermined digits defined by the capacity of the double buffer memories, and as to the coordinate data in a direction at right angle to the scanning line direction, the timing control means generates control signals in timing of change in the contents of the least significant digits.

Preferably, the image memory unit is a dual-port dynamic random access memory.

In accordance with the polygon filling control apparatus having the arrangement above-mentioned, the DDAs may simultaneously generate pixel data constituting line segments along the scanning line direction, based on control signals supplied from the DDA control means, and filling pixel data may be written into the block memories concerned, based on control signals generated by the timing control means.

Accordingly, filling pixel data simultaneously generated by a plurality of DDAs may be simultaneously written into the block memories concerned, respectively. This shortens the unit time required for generating one-pixel data, as well as the unit time required for writing one-pixel data. As a whole, the polygon filling speed is improved thereby to achieve, in real time, the display of a figure as filled.

More specifically, it is now supposed that the time required for executing an arithmetic operation in each DDA is $t_1$ and the time required for writing data into the image memory unit is $t_2$, ($t_2 = nt_1$, where "n" is an arbitrary integer). The image memory unit is constituted by $n$ block memories, and one double buffer memory and one timing control means are disposed for each block memory. In this case, data may be supplied from the double buffer memories to the corresponding block memories without interrupting the arithmetic operation of the DDAs. This enables data to be written into the image memory unit at a high speed.

In other words, when executing a polygon filling, pixel data continuous in the scanning line direction are successively generated by the DDAs, and a predetermined number of pixel data are successively supplied to the double buffer memories concerned. When a predetermined number of pixel data have been supplied to one of the planes of the double buffer memories concerned, the double buffer memories are switched in plane and a predetermined number of pixel data may be supplied to the other planes of the double buffer memories. While pixel data are being supplied to one of the planes of the double buffer memories, a predetermined number of pixel data may be collectively supplied from the other planes of the double buffer memories to the block memories concerned. This enables the pixel data to be continuously written into the image memory unit while the DDAs are continuously being operated at all times.

When there is employed the arrangement in which data writing into the block memories is made through the double buffer memories, it is merely possible that the time required for writing data into the block memories is made equal to the time required for generating data by the DDAs, when consideration is made on one-pixel data. This means the highest polygon filling speed is limited to the speed at which pixel data are generated by the DDAs.

In view of such inconvenience, the polygon filling control apparatus of the present invention is arranged as follows. The image memory unit is constituted by a plurality of block memories, and a plurality of DDAs are disposed for generating filling pixel data for different line segments along the scanning line direction. Also disposed are (i) the timing control means for generating, according to coordinate data supplied from the DDAs, control signals based on which pixel data are written into the block memories concerned, and (ii) the DDA control means for generating control signals for operating the DDAs concerned, according to the coordinate data of the line segments above-mentioned, in a direction at right angle to the scanning line direction. Accordingly, the DDAs may simultaneously generate filling pixel data along different scanning lines, and the filling pixel data thus generated may be written into the block memories concerned, based on control signals generated by the timing control means, at a speed equal to the pixel data generating speed in each DDA. It is therefore possible to considerably improve the unit time required for generating one-pixel data (i.e., the time obtained by dividing the time required for generating all filling pixel data, by the number of all filling pixel data), as well as the unit time required for writing one-pixel data into the block memories, as compared with the unit time required for actually generating one-pixel data by the DDAs. Thus, the real-time display of a polygon as filled may be achieved.

DETAILED DESCRIPTION OF THE PREFERRED EMBODIMENTS

Figure 1:
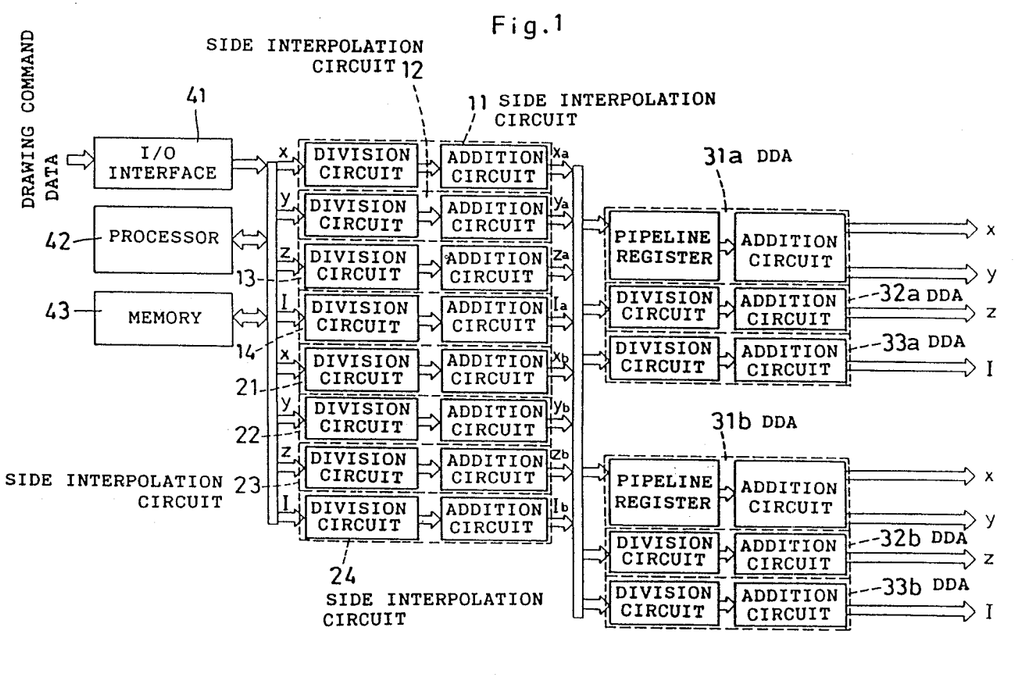
FIG. 1 is a block diagram of polygon filling control apparatus in accordance with a first embodiment of the present invention.

FIG. 1 is a block diagram of an embodiment of polygon filling control apparatus in accordance with the present invention. This apparatus comprises:

side interpolation circuits 11 to 14 and 21 to 24 for the x-, y- and z-values of two sides as three-dimensional coordinate values thereof, and for the index value (hereinafter referred to as the I-value) of the two sides above-mentioned;

a pair of DDAs 31a, 31b for receiving the x- and y-values supplied from the side interpolation circuits 11, 12, 21 and 22;

a pair of DDAs 32a, 32b for receiving the x- and z-values supplied from the side interpolation circuits 11, 13, 21 and 23;

a pair of DDAs 33a, 33b for receiving the x- and I-values supplied from the side interpolation circuits 11, 14, 21 and 24;

an I/0 interface 41 for fetching drawing command data;

a processor 42 for executing a side selection processing, a processing of selecting a DDA to which side interpolation data are to be supplied, and the like; and a memory 43.

Each of the side interpolation circuits and the DDAs includes a division circuit and an addition circuit for cumulatively adding division results, and provision is made such that respective interpolation operations may be simultaneously executed.

The processor 42 selects two sides of a polygon to be linearly interpolated based on apex data supplied from a host processor (not shown). Based on interpolation data supplied from the side interpolation circuits 12, 22, the processor 42 also selects the DDAs for the scanning lines concerned, such that linear interpolation of different line segments is carried out on different scanning lines. More specifically, when the arrangement shown in FIG. 2 (to be discussed later) is adopted, a DDA is selected each time the contents of the lower third digit of each interpolation data are changed.

Figure 2:
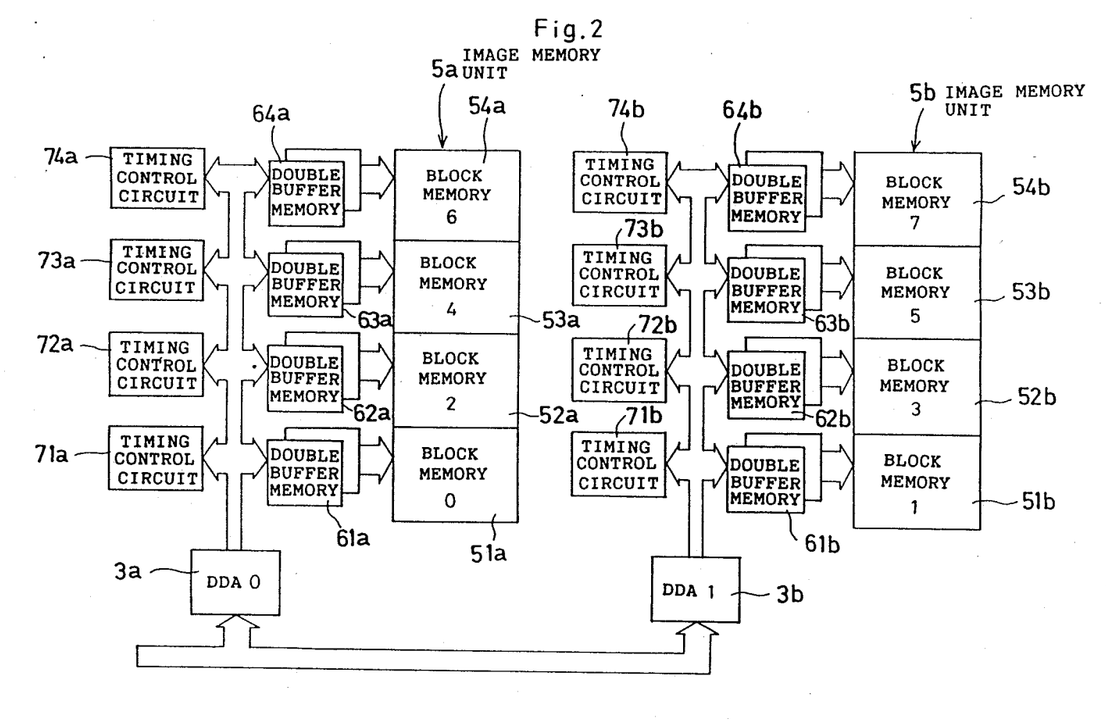
FIG. 2 is a block diagram of an arrangement for writing filling pixel data generated by a DDA unit, into an image memory unit.

FIG. 2 is a block diagram of an arrangement for writing filling pixel data generated by the DDAs, into an image memory unit.

In this arrangement, the image memory unit 5 is constituted by four block memories 51, 52, 53, 54, each of which is constituted by a DRAM. For the respective block memories 51, 52, 53, 54, there are disposed double buffer memories 61, 62, 63, 64 and timing control circuits 71, 72, 73, 74. Filling pixel data supplied from a DDA unit 3 are supplied to the double buffer memories 61, 62, 63, 64.

Each of the double buffer memories is formed by a pair of buffer memory planes, each having capacity for storing 1×8-pixel data. Provision is made such that while 8 filling pixel data supplied from the DDA unit 3 are being held by one plane of a double buffer memory, 8 filling pixel data held by the other plane of the same double buffer memory are collectively written into the block memory concerned.

The timing control circuits are adapted to decode the contents of predetermined lower digits of x- and y-coordinate data supplied from the DDA unit 3, thereby to generate decode data, based on which there are generated double buffer memory switching signals, double buffer memory selecting signals and block memory selecting signals. Also, the timing control circuits are adapted to time the supply of filling pixel data supplied from the DDA unit 3, to one of the planes of the double buffer memories selected, while filling pixel data, held by the other planes of the same double buffer memories, are collectively written into the block memories concerned.

More specifically, each time the contents of the lower 4th digits of x-coordinate data are changed, each time the contents of the least significant digits of y-coordinate data are changed and each time line segment drawing is completed (the contents of the DDA control counters are zero), the double buffer switching signals are generated. Each time the contents of the least significant digits of the y-coordinate data are changed, there is generated the double buffer memory selecting signals and the block memory selecting signals.

Each of the block memories 51, 52, 53, 54 has a dual-plane arrangement such that, during display of one image on one plane, the data of another image are written into the other plane.

In the polygon filling control apparatus having the arrangement shown in FIGS. 1 and 2, when drawing command data from a host processor (not shown) are supplied, the respective sides of a polygon are interpolated by the side interpolation circuits 11 to 14 and 21 to 24, thereby to successively generate interpolation data for opposite two sides. At each change in the contents of the least significant digits of the y-coordinate data out of the interpolation data thus generated, the interpolation data are supplied to the DDAs 31a, 32a, 33a or the DDAs 31b, 32b, 33b. Accordingly, line segments on different scanning lines are linearly interpolated by both DDAs, thereby to successively generate filling pixel data.

The filling pixel data successively generated by the DDAs, are supplied to one planes of the double buffer memories concerned, and the contents of the other planes of the same double buffer memories are collectively written into the block memories concerned, based on control signals supplied from the timing control circuits according to the filling pixel data supplied from the DDAs.

Accordingly, even though the time required for writing data into the block memories is 8 times the time required for generating filling pixel data by the DDAs, the filling pixel data may be written into the block memories without interrupting the operation for generating filling pixel data by the DDAs, except the periods of time for a refresh operation of the block memories and for an operation of reading data from the block memories.

Since data generation is simultaneously made in both DDAs, two filling pixel data are generated during the time that one DDA generates one filling pixel data. Further, the filling pixel data generated by the DDAs may be simultaneously written into the block memories. Accordingly, the time required for writing filling pixel data into the block memories may be reduced substantially to ½ of the time required for generating filling pixel data by the DDAs, when consideration is made on one-pixel data.

When one image has been written in the manner above-mentioned, the image may be read out from the image memory plane concerned, thereby to display the image. During such image display, data of the next image may be written into the other image memory plane.

This results in considerable improvement in polygon filling speed within a range double the speed at which filling pixel data are generated by the DDAs. This achieves a natural image display in real time.

In the embodiment above-mentioned, there are disposed two pairs of DDAs for simultaneously generating filling pixel data. However, it is also possible to dispose $2^n$ pairs of DDAs such that filling pixel data are simultaneously generated for $2^n$ line segments (where "n" is an arbitrary integer), thereby to further improve the polygon filling speed. In this case, however, provision should be made such that the contents of the lower $\underline{n}$ digits of y-coordinate data supplied from the side interpolation circuits 12, 22 are decoded and the DDAs are alloted according to the contents of the decode data.

Figure 3:
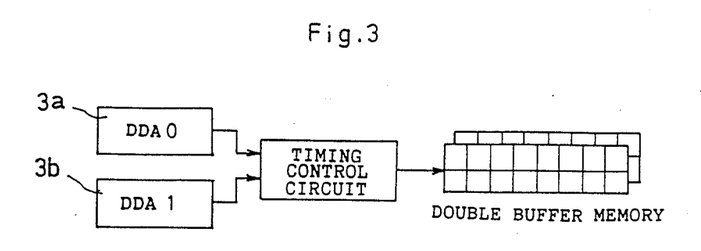
FIG. 3 is a block diagram of main portions of polygon filling control apparatus in accordance with a second embodiment of the present invention.

FIG. 3 is a block diagram of main portions of polygon filling control apparatus in accordance with a second embodiment of the present invention.

In this embodiment, filling pixel data supplied from two pairs of DDAs are supplied, through a timing control circuit unit, to the pixel row concerned of a double buffer memory. The double buffer memory has two planes, each having capacity of storing 2×8-pixel data. Accordingly, while filling pixel data are being supplied to one plane of the double buffer memory, pixel data are collectively written into a block memory from the other plane.

Accordingly, in this embodiment, the start timing and end timing of generation of filling pixel data are respectively synchronized in both DDAs. This improves the apparent filling pixel generating speed and the apparent filling pixel writing speed. This results in considerable enhancement of real-time operation.

Figure 4:
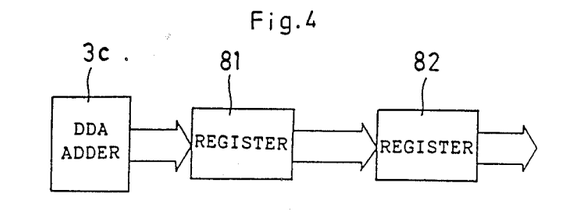
FIG. 4 is a schematic block diagram of a DDA in the form of a pipeline.

FIG. 4 is a block diagram of an arrangement for detecting variations of the contents of a specific digit of address data supplied from the DDA unit 3. Such detection may be facilitated by the arrangement in the form of a pipeline in which data supplied from a DDA adder 3c are successively supplied to registers 81 and 82.

This will be described in more detail with reference to FIG. 5.

D-type flip-flops (hereinafter referred to as D-FFs) are used as the registers 81, 82. The contents of the lth digit of data supplied from the DDA adder 3a may be supplied to a D-input terminal of the first-stage D-FF 81, and a Q-output signal may be supplied from the first-stage D-FF 81 to a D-input terminal of the second-stage D-FF 82, and a DDA clock signal may be supplied to timing input terminals of both D-FFs 81, 82. When the arrangement above-mentioned is used, there are obtained Q-output signals a1 , b1 , and $\overline{Q}$-output signal $\overline{a1}$ , $\overline{b1}$ from both D-FFs 81, 82. The signals b1 and $\overline{a1}$ thus obtained are supplied to an AND gate 83, and the signals a1 and $\overline{b1}$ are supplied to an AND gate 84. Output signals from both AND gates 83, 84 are supplied to a NOR gate 85. Thus, there is generated a detection flag for detecting a change in the contents of a specific digit.

Figure 6:
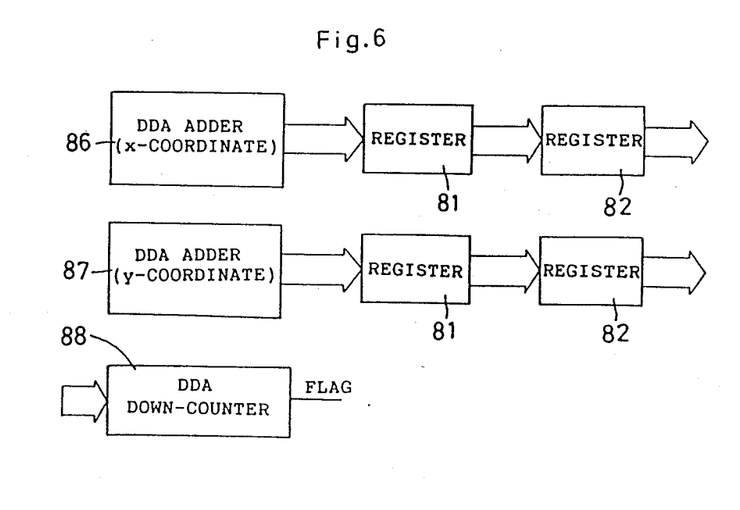
FIG. 6 is a schematic block diagram showing a pair of DDAs in the form of a pipeline.
Figure 7:
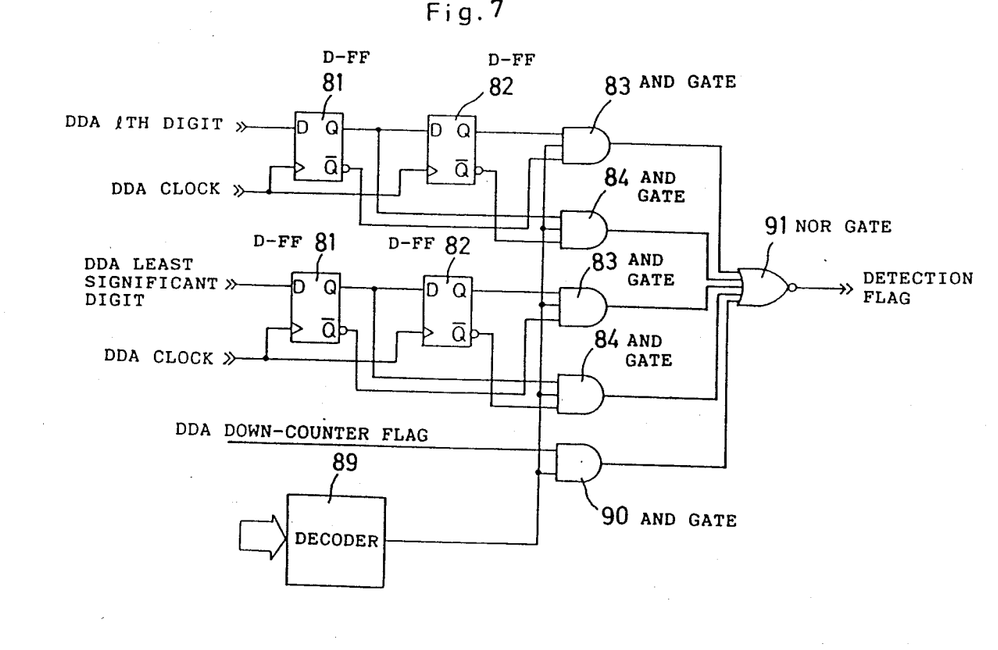
FIG. 7 is a block diagram of another example of the circuit arrangement for detecting variations of the contents of a specific digit of address data.

FIG. 6 is a block diagram schematically showing an electric arrangement in which, only when the lower digits of each y-coordinate data has predetermined contents, there are detected:

(i) a change in the contents of the least significant digit of each y-coordinate data;

(ii) a change in the contents of a digit located in an upper position by a predetermined number of digits from the least significant digit, of each x-coordinate data; and (iii) the completion of line segment drawing, FIG. 7 shows an electric arrangement in which the arrangement in FIG. 6 is shown in more detail.

Figure 5:
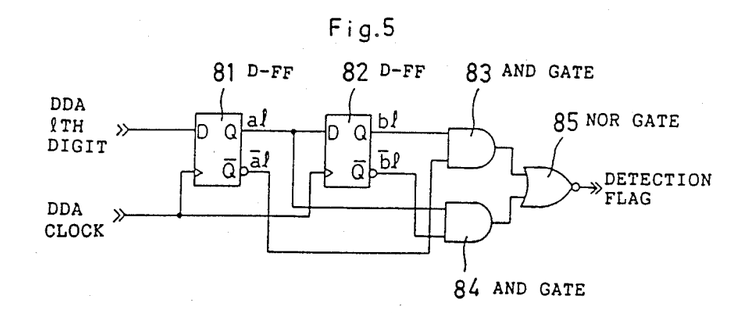
FIG. 5 is a view of an example of a circuit arrangement for detecting variations of the contents of a specific digit of address data.

In FIG. 7, data supplied from a DDA adder 86 for the x-coordinate and a DDA adder 87 for the y-coordinate are respectively supplied to circuits each having the same arrangement in FIG. 5. An AND gate 90 is adapted to receive:

(i) a flag from a DDA down-counter 88 (an overflow flag which becomes high when the contents of the downcounter 88 are zero); and (ii) a signal from a decoder 89 which becomes high when the contents of lower digits of the y-coordinate data supplied from the DDA represent the block memory concerned.

The signal supplied from the decoder 89 is supplied to all the AND gates, and signals from all the AND gates are supplied to a NOR gate 91.

In the arrangement above-mentioned, when the output signal from the decoder 89 is in the high level, the NOR gate 91 supplies a double buffer memory switching timing detection flag of the negative logic, according to the change in the contents of the least significant digit of the y-coordinate data, the change in the contents of a predetermined digit of the x-coordinate data and the completion of line segment drawing.

The decoder and AND-OR-INVERTER shown in FIG. 7 may be easily made in the form of PAL (Programable Alley Logic).

Figure 8:
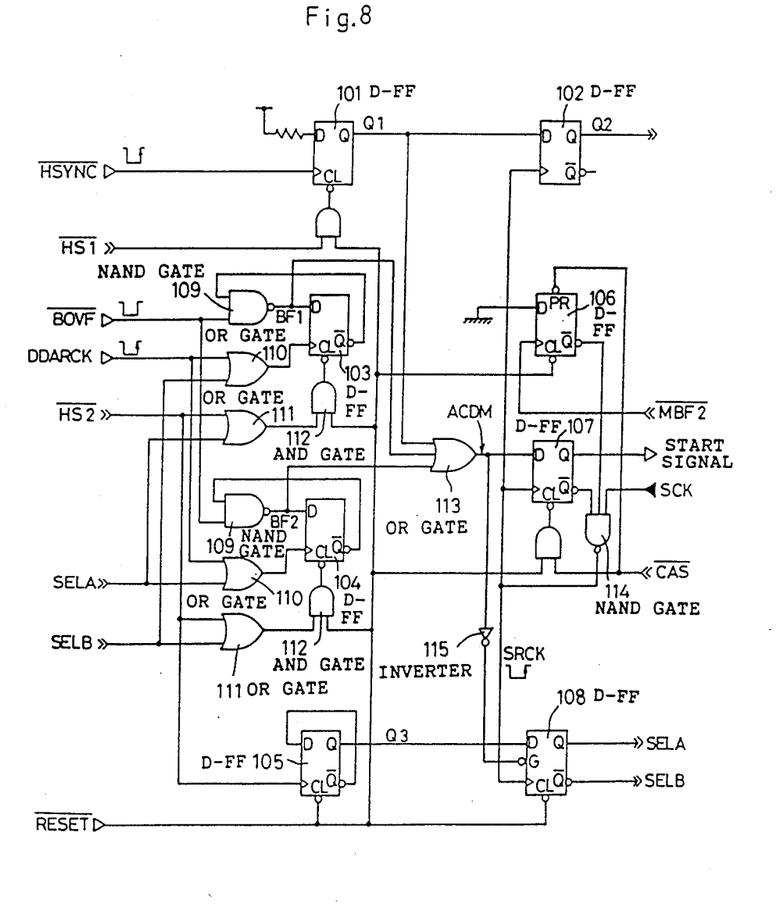
FIG. 8 is a view of a circuit arrangement for controlling the DRAM timing and for switching a double buffer memory in plane, based on a double buffer memory switching timing detection flag.

FIG. 8 shows a circuit arrangement for achieving the DRAM timing control and the double buffer memory switching without interrupting the DDAs, based on the double buffer memory switching timing detection flag generated in the circuit arrangement shown in FIG. 7. In FIG. 8, eight D-FFs 101 to 108 are used.

Figure 9:
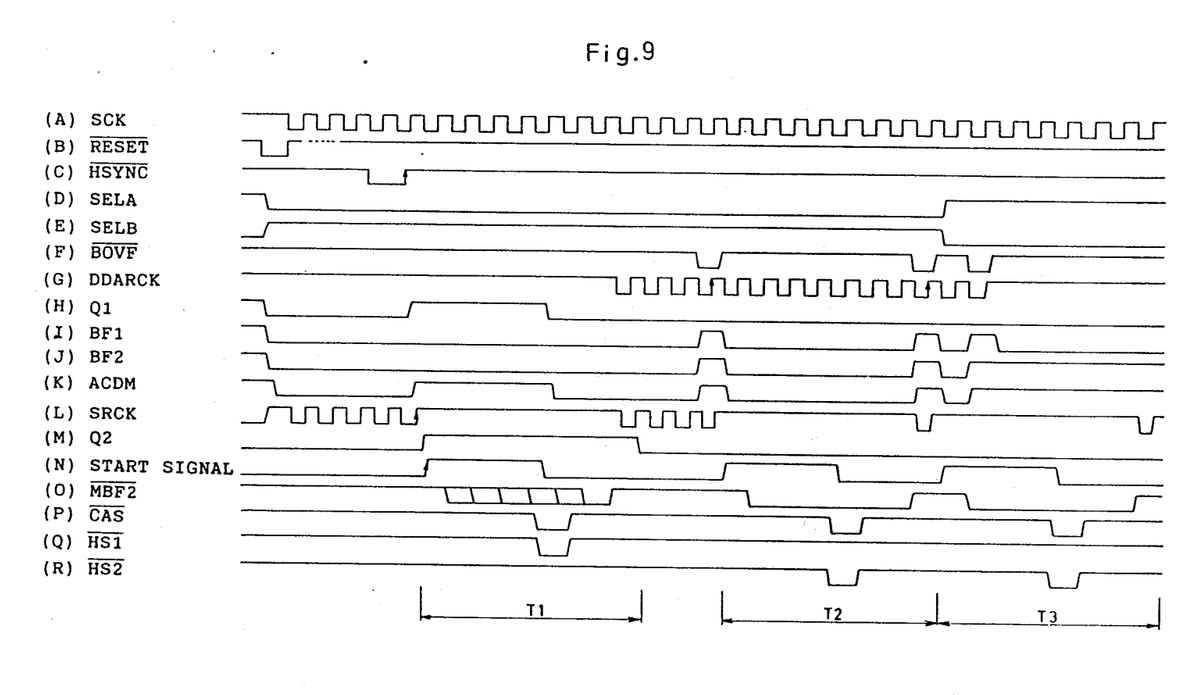
FIG. 9 is a timing chart illustrating the operation of the circuit arrangement in FIG. 8.

The D-FF 101 receives:

(i) a horizontal synchronizing signal $\overline{HSYNC}$ supplied from a CRT controller (not shown) (See FIG. 9 (C)), as a timing signal; and (ii) a hand shake signal $\overline{HS1}$ presenting whether or not read transfer/refresh has been accepted (See FIG. 9 (Q)), as a clear signal.

Upon reception of the signals above-mentioned, the D-FF 101 generates a Q-output signal Q1 presenting whether or not a request for DRAM read transfer or refresh has been made (See FIG. 9 (H)). The Q-output signal Q1 is, as it is, supplied to a D-input terminal of the D-FF 102 which receives a sampling strobe signal SRCK (See FIG. 9 (L)), as a timing signal. In turn, the D-FF 102 generates a Q-output signal Q2 presenting whether this is a DRAM write cycle or a DRAM read transfer/refresh cycle (See FIG. 9 (M)).

The D-FFs 103, 104 are disposed for holding a double buffer memory switching timing detection flag $\overline{BOVF}$ (See FIG. 9 (F)). The D-FFs 103, 104 are operated selectively but in the same manner. More specifically, each of the D-FFs 103, 104 has a D-input terminal to which the double buffer memory switching timing detection flag $\overline{BOVF}$ is supplied through a NAND gate 109 which receives a Q-output signal from each of the D-FFs 103, 104, as a control signal. Each of the D-FFs 103, 104 has a timing input terminal to which a DDA pixel strobe signal DDARCK of which level varies for every pixel (See FIG. 9 (G)), is supplied through an OR gate 110. Each of the D-FFs 103, 104 has a clear input terminal to which supplied is a negative-logic hand shake signal $\overline{HS2}$ presenting that the memory write cycle has been accepted (See FIG. 9 (R)), through an OR gate 111 and an AND gate 112. For one D-FF, a Q-output signal SELA (See FIG. 9 (D)) and a $\overline{Q}$-output signal SELB (See FIG. 9 (E)) both supplied from the D-FF 108 are respectively supplied to the OR gates 110, 111. For the other D-FF, the Q-output signal SELA and the $\overline{Q}$-output signal SELB both supplied from the D-FF 108 are respectively supplied to the OR gates 111 and 110.

Accordingly, the double buffer memory switching timing detection flag $\overline{BOVF}$ is fetched, provided that there is selected, as a data holding flip-flop, the D-FF for which the Q-output signal SELA and the $\overline{Q}$-output signal SELB in the low level are supplied to the OR gate 110, and that the DDA pixel strobe signal DDARCK rises. However, the double buffer memory switching timing detection flag $\overline{BOVF}$ is supplied through the NAND gate 109 controlled by the $\overline{Q}$-output signal [See signals BF1 and BF2 (FIG. 9 (I) and (J))]. Accordingly, the double buffer memory switching timing detection flag $\overline{BOVF}$ is simultaneously supplied both to the D-input terminal and to an OR gate 113, to be discussed later, in timing at which a buffer memory full state is about to take place. The double buffer memory switching timing detection flag $\overline{BOVF}$ is then held as it is.

The D-FF 105 is disposed for generating a Q-output signal Q3 for the next double buffer memory switching state. The D-FF 105 has a D-input terminal to which a $\overline{Q}$-output signal is supplied, and a timing input terminal to which the negative-logic hand shake signal $\overline{HS2}$ is supplied.

The D-FFs 106, 107 are disposed for generating a sampling strobe signal SRCK which is synchronous with clock, without generating glitch. The D-FF 106 has a timing input terminal to which supplied is a negative-logic pulse signal $\overline{MBF2}$ (FIG. 9 (O)) presenting that the sequence is 2 clocks before the memory cycle is finished. The D-FF 106 also has a preset input terminal to which supplied is a negative-logic pulse signal $\overline{CAS}$ that is always generated once in the memory cycle [for example, a DRAM column address strobe signal (See FIG. 9 (P))]. The D-FF 107 has a D-input terminal to which supplied are:

(i) the Q-output signal Q1 from the D-FF 101; and
(ii) signals from the NAND gates 109 for the D-FFs 103, 104, through the OR gate 113.

A NAND gate 114 receives $\overline{Q}$-output signals of the D-FFs 106, 107, and a sampling clock signal SCK (See FIG. 9 (A)). In turn, the NAND gate 114 supplies a sampling strobe signal SRCK. The signal SRCK is also supplied to the timing input terminal of the D-FF 107. The negative-logic pulse signal $\overline{CAS}$ is supplied to a clear input terminal of the D-FF 107. The Q-output signal of the D-FF 107 is supplied as a start signal (See FIG. 9 (N)) of which rise represents the start of the memory cycle.

The D-FF 108 is disposed for supplying the double buffer memory switching signals SELA, SELB as Q-output signal and $\overline{Q}$-output signal, respectively. The D-FF 108 has a D-input terminal to which the Q-output signal Q3 of the D-FF 105 is supplied, and also has a timing input terminal to which the sampling strobe signal SRCK is supplied. The D-FF 108 has also a G-input terminal to which an output signal ACDM (See FIG. 9 (K)) from the OR gate 113 is supplied through an inverter 115.

Accordingly, the Q-output signal from the D-FF 105 is held at the timing that the signal supplied to the G-input terminal is low and that the sampling strobe signal SRCK rises. According to the level of this Q-output signal, the D-FF 108 continuously supplies the Q-output signal SELA and the $\overline{Q}$-output signal SELB of which levels are opposite to each other.

A negative-logic initialization signal $\overline{RESET}$ (See FIG. 9 (B)) is supplied to each of the clear input terminals of the D-FF 101 to 108.

The following description will discuss the operation of the circuit shown in FIG. 8.

When the power is turned ON or when the processing is started with the use of the apparatus of the present invention, a necessary initialization is made by a initialization signal $\overline{RESET}$. Afterwards, the Q-output signal Q3 of the D-FF 105 alternately varies in level each time the negative-logic hand shake signal $\overline{HS2}$ is supplied to the timing input terminal of the D-FF 105. Accordingly, the D-FF 108 holds the Q-output signal Q3 at the timing that a low-level signal is supplied to the G-input terminal of the D-FF 108 and that the sampling strobe signal SRCK rises. Thus, the D-FF 108 supplies the Q-output signal SELA and the $\overline{Q}$-output signal SELB according to the level of the Q-output signal Q3. Either one of the D-FFs 103, 104 is selected based on the levels of the Q-output signal SELA and $\overline{Q}$-output signal SELB. That is, there is selected the D-FF for which the OR gate 110 has received a low-level signal.

The selected D-FF receives, as the D-input signal, the double buffer memory switching timing detection flag $\overline{BOVF}$ through the NAND gate 109 controlled by the $\overline{Q}$-output signal. This D-FF also receives, as the timing input signal, the DDA pixel strobe signal DDARCK through the OR gage 110. Accordingly, this D-FF fetches the double buffer memory switching timing detection flag $\overline{BOVF}$, at the rise timing of the DDA pixel strobe signal DDARCK. The double buffer memory switching timing detection flag $\overline{BOVF}$ is then held as it is. The double buffer memory switching timing detection flag $\overline{BOVF}$ is not taken out from the Q-output terminal of this D-FF, but it is taken out, as it is, from the output terminal of the NAND gate 109. Accordingly, the double buffer memory switching timing detection flag $\overline{BOVF}$ is supplied to the OR gate 113 at the timing that the buffer memory full state is generated, without any delay for one-pixel data. The double buffer memory switching timing detection flag $\overline{BOVF}$ is then supplied to the D-input terminal of the D-FF 107. Thus, the D-FF 107 supplies, from the Q-output terminal thereof, the start signal representing that the memory cycle starts.

Each time the negative-logic hand shake signal $\overline{HS2}$ is supplied to the timing input terminal of the D-FF 105, the selection of the D-FFs 103, 104 is switched, and a series of the operations above-mentioned will be carried out.

FIG. 9 is a timing chart illustrating the operations of the respective units in the circuit shown in FIG. 8.

In FIG. 9, there are carried out the image data read/transfer operation in a period of time T1, and the image data write operation in periods of time T2, T3.

Accordingly, when the timing control circuit having the arrangement shown in FIGS. 5 and 7 is disposed for each block memory, it is possible to successively carry out an operation of writing generated pixel data into the image memory unit 5, without interrupting the arithmetic operation of the DDA unit 3.

In the embodiment above-mentioned, when a dual-port DRAM is used as the DRAM, the time required for reading data to be displayed may be considerably shortened. This allows 98% of the entire processing time to be used for data writing. As a whole, the time required for writing data into the image memory unit may be shortened.

It is apparent that the polygon filling control apparatus in accordance with the present invention should not be limited to the embodiments above-mentioned.

For example, instead of the arrangement in which a plurality of block memories are alloted to all DDAs, a plurality of block memories may be alloted to at least one DDA. This enables the entire apparent filling pixel drawing speed to be made higher than the DDA filling pixel generating speed. It is also possible to use double buffer memories, each having capacity of storing (n×m)-pixel data, to which supplied are filling pixel data simultaneously supplied from n DDAs. Other modifications and variations may be made without departing from the spirit and principle of the present invention.

What is claimed is:

1. A polygon filling control apparatus, comprising:
an image memory unit;
a first linear interpolation operation means for dividing a polygon into line segments along the scanning line direction;
a second linear interpolation operation means for generating filling pixel data for every line segment and for writing the filling pixel data into said image memory unit as output data for display means;
said image memory unit including a plurality of block memories allotted for different line segments along the scanning line direction of the display means;
said second linear interpolation operation means including a plurality of linear interpolation operation units for generating filling pixel data for the different line segments along the scanning line direction, said block memories being allotted to each of the linear interpolation operation units and each of said linear interpolation operation units operating independently;
timing control means for generating, according to coordinate data supplied from said linear interpolation operation units, control signals for writing pixel data into said block memories concerned;
linear interpolation operation unit control means for generating control signals for selecting and controlling said linear interpolation operation units concerned, according to coordinate data of the different line segments in a direction at a right angle to the scanning line direction with the coordinate data being in reference to a reference arrangement associated with a display means.

2. A polygon filling control apparatus as set forth in claim 1, wherein the writing of pixel data generated by the linear interpolation operation units into the block memories, is made through double buffer memories.

3. A polygon filling control apparatus as set forth in claim 2, wherein, as to the display coordinate data located along the scanning line direction, said timing control means generates control signals in time with changes in the contents of predetermined digits defined by the capacity of the double buffer memories, and. as to the display coordinate data in a direction at a right angle to said scanning line direction, the timing control means generates control signals in time with changes in the contents of the least significant digits.

4. A polygon filling control apparatus as set forth in claim 2, wherein the image memory unit is a dual-port dynamic random access memory.

5. A polygon filling control apparatus as set forth in claim 1, wherein said linear interpolation operation control means controls said plurality of linear interpolation units such that filling pixel data is essentially simultaneously generated by said linear interpolation operation units.

6. A polygon filling control apparatus as set forth in claim 5, wherein said timing control means includes means for timing the writing of pixel data into said block memories such that the writing occurs essentially simultaneously with respect to each of said block memories.

7. A polygon filling control apparatus as set forth in claim 1, wherein said timing control means includes means for timing the writing of pixel data into said block memories such that the writing occurs essentially simultaneously with respect to each of said block memories.

8. A polygon filling control apparatus as set forth in claim 1, wherein (t1) represents the time required for said linear interpolation operation units to execute an arithmetic operation for generating pixel data and (t2) represents the time required for said second linear interpolation operation means to write pixel data into said image memory unit and wherein (t2=nt1) with n representing a positive integer as well as the number of said block memories in said image memory unit.

* * * * *